H. SCHNEIDER.
TRANSMISSION GEARING.
APPLICATION FILED JULY 5, 1916.
1,230,798.
Patented June 19, 1917.
2 SHEETS—SHEET 1.
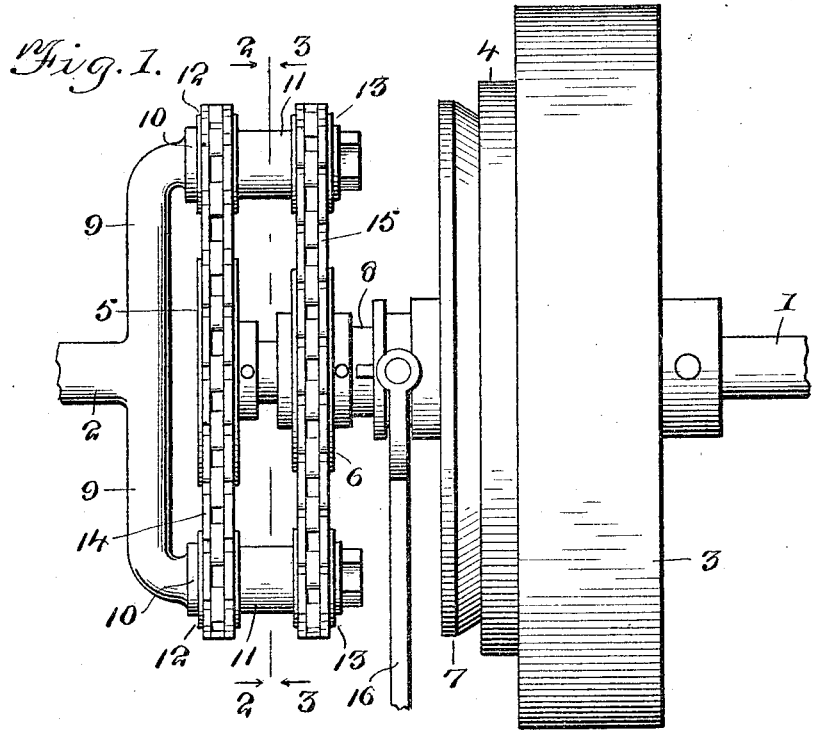
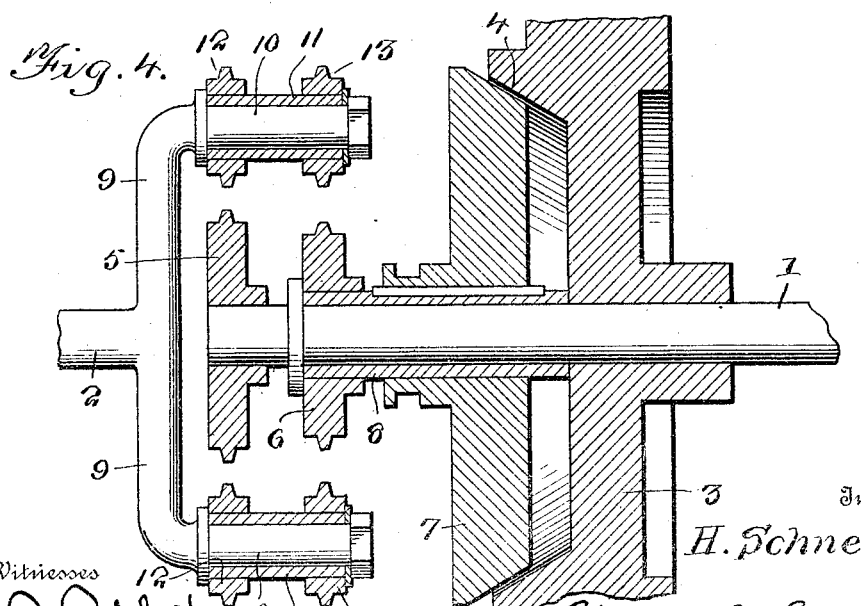
Witnesses
E. P. Ruppert
R. M. Smith
Inventor
H. Schneider
By Victor J. Evans
Attorney

H. SCHNEIDER.
TRANSMISSION GEARING.
APPLICATION FILED JULY 5, 1916.

1,230,798.

Patented June 19, 1917.
2 SHEETS—SHEET 2.

Inventor
H. Schneider
By Victor J. Evans
Attorney

Witnesses
E. Q. Ruppert
R. M. Smith

UNITED STATES PATENT OFFICE.

HANS SCHNEIDER, OF NEW YORK, N. Y.

TRANSMISSION-GEARING.

1,230,798.  Specification of Letters Patent.  Patented June 19, 1917.

Application filed July 5, 1916. Serial No. 107,610.

*To all whom it may concern:*

Be it known that I, HANS SCHNEIDER, a citizen of Switzerland, residing at New York, in the county of New York and State of New York, have invented new and useful Improvements in Transmission-Gearing, of which the following is a specification.

This invention relates to transmission gearing and while particularly designed for use in connection with the driving mechanism of motor vehicles, it will be apparent, as the description proceeds, that said transmission gearing is adapted for use in other connections, or wherever it is desired to vary the speed of a driving shaft and a driven shaft or also discontinue or interrupt the operation of the driven shaft.

One of the chief aims of this invention is to do away with the intermeshing gears such as are used in the present day types of planetary and sliding gear transmission devices and to substitute in lieu thereof simple mechanism for accomplishing the same result, the improved mechanism being economically produced and maintained in working condition.

A further object in view is to prevent the sudden gripping or grabbing action between the clutch faces by means of which the motion of the fly wheel or clutch member fast on the driving shaft, is imparted to the driven shaft, the coöperating clutch faces on the driving and driven shafts rotating constantly as long as the driving shaft is rotating.

With the above and other objects in view, the invention consists in the novel construction, combination and arrangement of parts, as herein described, illustrated and claimed.

In the accompanying drawings:—

Figure 1 is a plan view of the transmission gearing of this invention.

Fig. 4 is a section taken longitudinally of the driving and driven shafts showing the latter in elevation.

Figure 2:
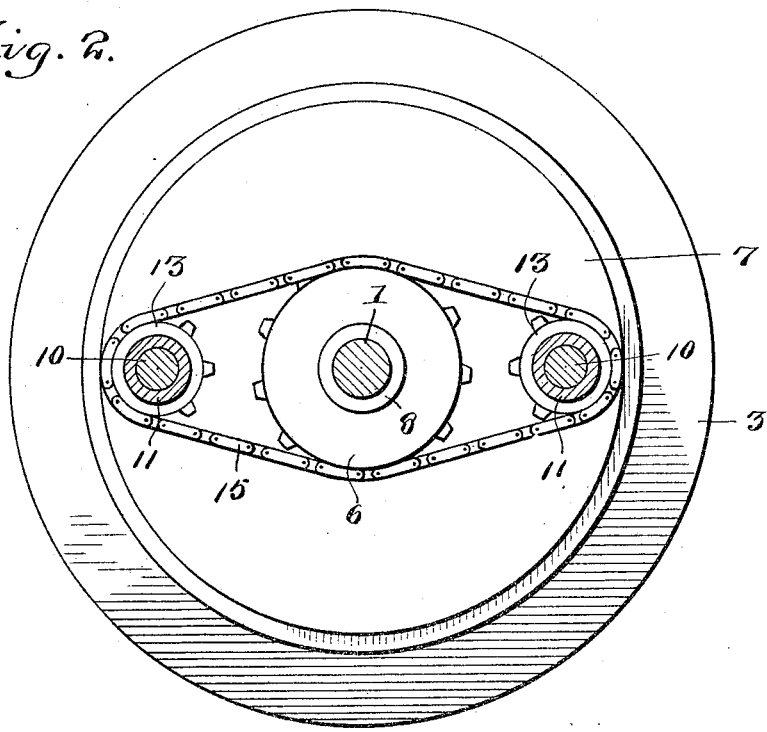
Fig. 2 is a section on the line 2—2 of Fig. 1 looking in the direction of the arrow.
Figure 3:
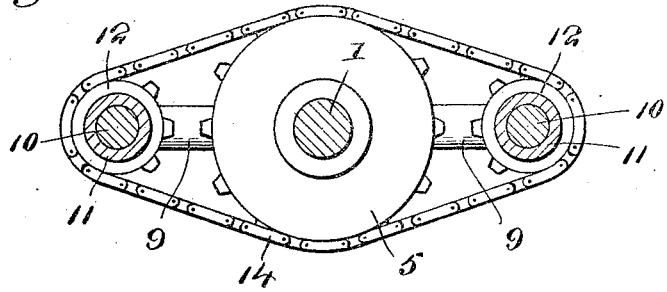
Fig. 3 is a section on the line 3—3 of Fig. 1 looking in the direction of the arrow.

Referring to the drawings 1 designates the driving shaft and 2 the driven shaft of the transmission gearing. In automobile practice, the fly wheel 3 is fast on the driving shaft, and is provided on one side thereof with a clutch face 4 the purpose of which will presently appear. Adjacent to or at one end, the shaft 1 has fast thereon a sprocket wheel 5. The driving shaft 1 has mounted loosely thereon another sprocket wheel 6 of slightly less diameter than the wheel 5, the wheel 6 having a fixed relation to a clutch member 7 the working face of which is adapted to coöperate with the clutch face 4 of the wheel 3. The wheel 6 and clutch member 7 are connected together by a sleeve or hollow shaft 8 which loosely surrounds the driving shaft 1; thus the wheel 6 and clutch member 7 are adapted to turn upon and independently of the driving shaft 1.

The driven shaft 2, at the end thereof adjacent to the extremity of the driving shaft 1, is provided with a fork comprising the oppositely extending arms 9 shown as substantially perpendicular to the shaft 2 and provided with journals 10 parallel to the axes of the shafts 1 and 2 and overlapping the end portion of the shaft 1. Mounted on each of the journals 10 is a bearing sleeve 11 having fast thereon sprocket wheels 12 and 13. A chain 14 extends around the wheels 12 and is driven by the wheel 5 which is fast on the shaft 1. Another sprocket chain 15 passes around the wheels 13 and drives the wheel 6. Any suitable means may be employed for shifting the working faces of the clutch members 3 and 7 into or out of engagement with each other. I have shown a lever 16 which coöperates with the clutch member 7 for the purpose of shifting the latter toward and away from the clutch face 4 of the wheel 3 so as to obtain any desired pressure between the clutch faces or so as to free said faces from each other. The engine or motor power (not shown) continuously drives the driving shaft 1 and as the wheels 3 and 5 are fast on said shaft, both of said wheels rotate therewith. The rotating wheel 5, through the medium of the chain 14 drives the wheels 12 and as said wheels 12 are fast on the same bearing sleeves with the wheels 13, the latter are driven simultaneously with the wheels 12 thereby imparting motion to the chain 15 which in turn drives the wheel 6 and consequently the clutch member 7 which is connected to the wheel 6 by the hollow shaft or sleeve 8. Therefore the clutch member 7 is rotated in the same direction as the wheel 3. However, the wheel 6 is made slightly smaller than the wheel 5, the same having a smaller number of teeth than the wheel 5 which causes the wheel 6 and therefore the clutch member 7 to be revolved at a slightly greater speed than the wheel 3 but in the same direction. When the clutch member 7 is not touching the clutch face 4 of the wheel 3, no motion is imparted to the driven shaft 2 but the clutch member is rotated in the same direction as the wheel 3 by means of the chains 14 and 15 and the sprocket wheels under the arrangement hereinabove described. When the clutch member 7 is pressed tightly against the clutch face 4, the members 3 and 7 are caused to revolve at the same speed because there is no slip or lost motion between said members 3 and 7. Under the condition just referred to, and in view of the difference of the sizes of the wheels 5 and 6, the sprocket elements may be said to be locked and therefore the shaft 2 is driven at the same speed as the shaft 1, all of the sprocket mechanism being caused to revolve on account of the inability of the wheels 5 and 6 to turn. By relieving, more or less, the friction or pressure between the working faces of the clutch member 7 and wheel 3, slippage is allowed between the clutch faces, thereby permitting a resisted movement of the sprocket wheels and chains which results in driving the driven shaft 2 at a lower speed than the driven shaft 1, the ratio of speed between the driving and driven shafts being governed by the pressure brought to bear on the clutch member 7 toward the clutch face 4 and the consequent amount of slippage permitted between the members 3 and 4.

I do not desire to be restricted to clutch faces of any particular shape as the clutch members may have flat contacting surfaces or rounded or cone shaped contacting faces, nor do I desire to be restricted to any particular means for producing any relative movement between the clutch members or other working faces. These and other changes in the form, proportion and minor details of construction, may be resorted to without departing from the principle or sacrificing any of the advantages of the invention.

I claim:—

1. In transmission gearing, the combination of a driving shaft, a driven shaft, a clutch member fast on the driving shaft, a coöperating clutch member normally loose on the driving shaft, arms on the driven shaft, bearing sleeves journaled on said arms, a pair of sprocket wheels fast on each bearing sleeve, a sprocket wheel fast on the driving shaft, another sprocket wheel loose on the driving shaft and having a fixed relation to the adjacent clutch member, a sprocket chain passing around two of the sprocket wheels on the arms of the driven shaft and also around the sprocket wheel which is fast on the driving shaft, and another chain passing around the other sprocket wheels on the arms of the driven shaft and also around the remaining sprocket wheel which has a fixed relation to the adjacent clutch member.

2. In transmission gearing, the combination of a driving shaft, a driven shaft, a clutch member fast on the driving shaft, a coöperating clutch member normally loose on the driving shaft and movable into and out of engagement with the first named clutch member, arms extending in opposite directions from the driven shaft and having a fixed relation thereto, and driving elements carried by the driving shaft and the driven shaft and also having connection with the normally loose clutch member, whereby the last named clutch member is revolved in the same direction as the first named clutch member as long as the driving shaft is in operation.

3. In transmission gearing, the combination of a driving shaft, a driven shaft, a clutch member fast on the driving shaft, a coöperating clutch member normally loose on the driving shaft, arms on the driven shaft, bearing sleeves journaled on said arms, a pair of sprocket wheels fast on each bearing sleeve, a sprocket wheel fast on the driving shaft, another sprocket wheel loose on the driving shaft and having a fixed relation to the adjacent clutch member, a sprocket chain passing around two of the sprocket wheels on the arms of the driven shaft and also around the sprocket wheel which is fast on the driving shaft, and another chain passing around the other sprocket wheels on the arms of the driven shaft and also around the remaining sprocket wheel which has a fixed relation to the adjacent clutch member, the sprocket wheel which has a fixed relation to the normally loose clutch member and the sprocket wheel which is fast on the driving shaft being of different diameters, causing the normally loose clutch member to revolve at a different speed from the clutch member coöperating therewith.

In testimony whereof I affix my signature.

HANS SCHNEIDER.

Copies of this patent may be obtained for five cents each, by addressing the "Commissioner of Patents, Washington, D. C."